United States Patent [19]

Eckelt

[11] Patent Number: 4,590,832
[45] Date of Patent: May 27, 1986

[54] APPARATUS FOR APPLYING WEB SECTIONS TO A FLAT WORKPIECE

[75] Inventor: Ulrich Eckelt, Tecklenburg, Fed. Rep. of Germany

[73] Assignee: Windmöller & Hölscher, Lengerich, Fed. Rep. of Germany

[21] Appl. No.: 601,547

[22] Filed: Apr. 18, 1984

[30] Foreign Application Priority Data

Apr. 20, 1983 [DE] Fed. Rep. of Germany ....... 3314374

[51] Int. Cl.⁴ .............................................. B26D 7/06
[52] U.S. Cl. ........................................ 83/100; 83/152; 83/160; 83/261
[58] Field of Search ................. 83/150, 152, 158, 160, 83/98, 100, 257, 261

[56] References Cited

U.S. PATENT DOCUMENTS 3,222,969  12/1965  Clausen ................................ 83/152
3,672,249  6/1972   Sasaki .................................. 83/152
4,338,083  7/1982   Andrae ................................. 83/152

FOREIGN PATENT DOCUMENTS 2824596  8/1980  Fed. Rep. of Germany .

Primary Examiner—Frank T. Yost
Assistant Examiner—Hien H. Phan
Attorney, Agent, or Firm—Fleit, Jacobson, Cohn & Price

[57] ABSTRACT

In apparatus for applying a length of web severed from a supply reel to a flat workpiece, the web is advanced intermittently by a driven pair of rollers. A carrier which is secured to swing levers and provided with suckers suction-attracts a section severed from the web and swings it for depositing onto the flat workpiece. Between its receiving and depositing positions, the carrier is pivotable through an acute angle and a reciprocatable slide is provided which sweeps the web section over the sucker-equipped side of the carrier.

7 Claims, 5 Drawing Figures

APPARATUS FOR APPLYING WEB SECTIONS TO A FLAT WORKPIECE

The invention relates to apparatus for applying to a flat workpiece a web section severed from a web withdrawn from a supply reel, preferably an inner lock or base cover sheet to a pulled-open base or one that is already closed, comprising an intermittently driven pair of rollers for advancing the web in sections and feeding it freely suspended between clamping jaws which are arranged at both sides thereof, can be moved towards and away from each other and are each segmented by a gap which is disposed transversely to the web feeding direction, lies in a common plane and guides a knife for severing web sections, and comprising a carrier which is secured to swing levers, provided with suckers, receives the attracted section and, after severing from the web, swings it to the flat workpiece and deposits it.

In an apparatus of this kind known from DE-PS 28 24 596, the carrier is itself pivotably mounted on the swing levers and can be pivoted relatively to the swing levers through about 90° by way of drive means between its substantially vertical receiving position and its substantially horizontal depositing position. After the section has been suction-attracted, the carrier swings through the vertical plane of the previously freely suspended length of web so that the following length of web can be advanced only after the carrier has been swung back to its receiving position. Since swinging back of the carrier and advancing the next length of web must therefore take place successively, the known apparatus cannot achieve a higher number of cycles required to correspond to a higher output.

It is therefore the problem of the invention to provide an apparatus of the aforementioned kind having an increased output.

According to the invention, this problem is solved in that the carrier is pivotable between its receiving and depositing positions through an acute angle and a reciprocatable slide is provided which passes through the plane of the freely suspended web section and sweeps same over the sucker-equipped side of the carrier. The apparatus of the invention can be operated with a high number of cycles because the carrier is always disposed on only one side of the feeding plane of the web so that the next following web section can already be advanced whilst the last section received is being deposited by the carrier and possibly welded on. Compared with the known apparatus, the output can be increased still further in that, for the purpose of applying the sections, only the swing levers need be swung through an acute angle without requiring any additional pivoting of the carriers relatively to the swing levers.

Sweeping on the freely suspended web section over the sucker-equipped side of the carrier can be carried out relatively quickly and without prolonged loss of time.

Advantageous embodiments of the invention have been described in the subsidiary claims.

One example of the invention will be described in more detail with reference to the drawing, wherein.

Figure 1:
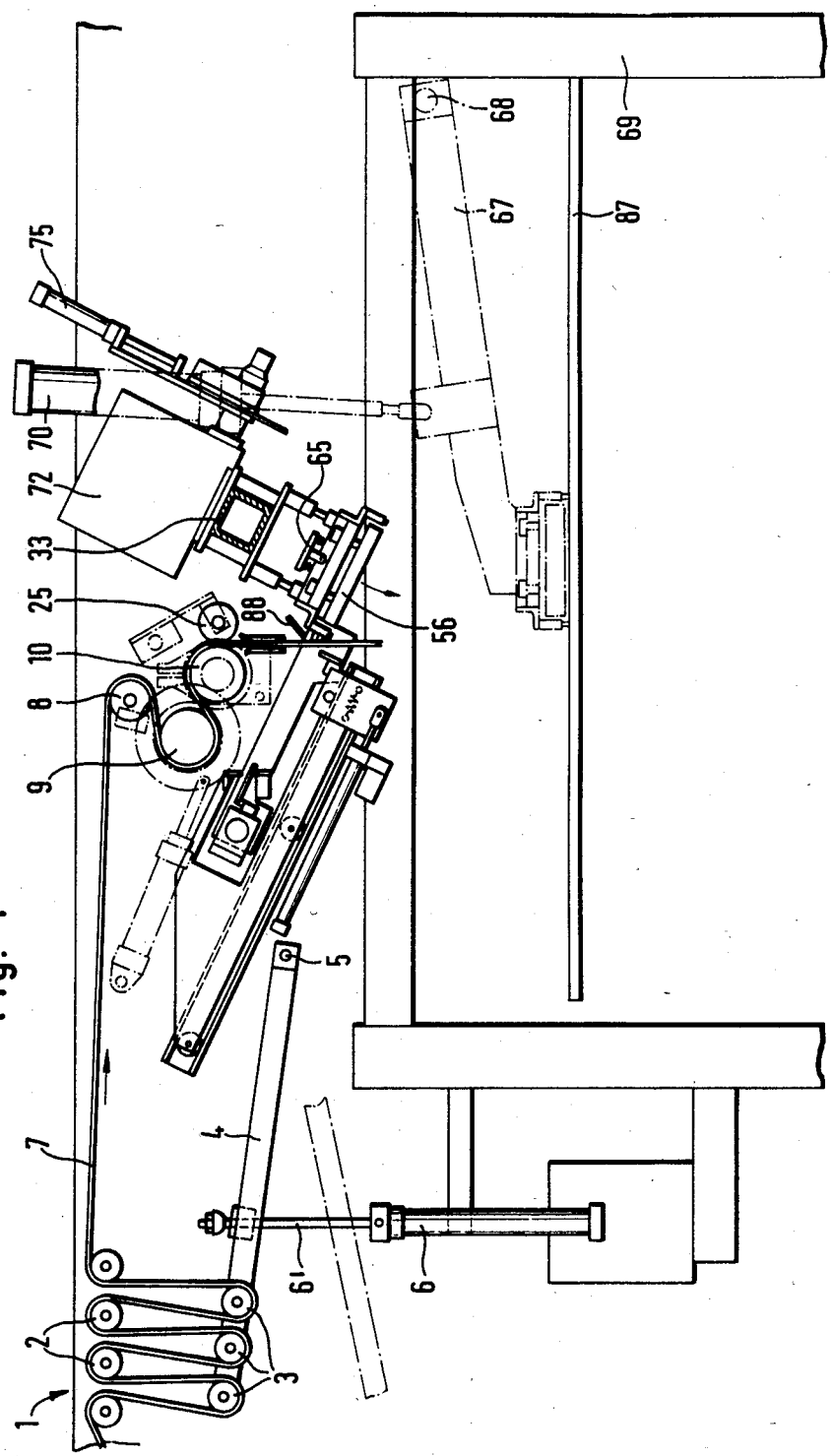
FIG. 1 is a diagrammatic side elevation of the apparatus for applying web sections.

A web store 1 has its upper rollers 2 rotatably mounted in the machine frame. The lower rollers 3 of the web store 1 are rotatable at one end of a swing member 4 which is freely pivotable about the fixed shaft 5. For the purpose of filling the web store, a piston cylinder unit 6 moves the swing member 4 into the position shown in broken lines. As soon as this has occurred, the piston rod 6 is fully projected again and, immediately after filling of the store, again reaches the position shown in full lines. The swing member 4, however, still remains in the position shown in broken lines. Following the store 1, the web 7 passes about a direction-changing roller 8 and, in S formation, about the feed rollers 9 and 10.

Figure 5:
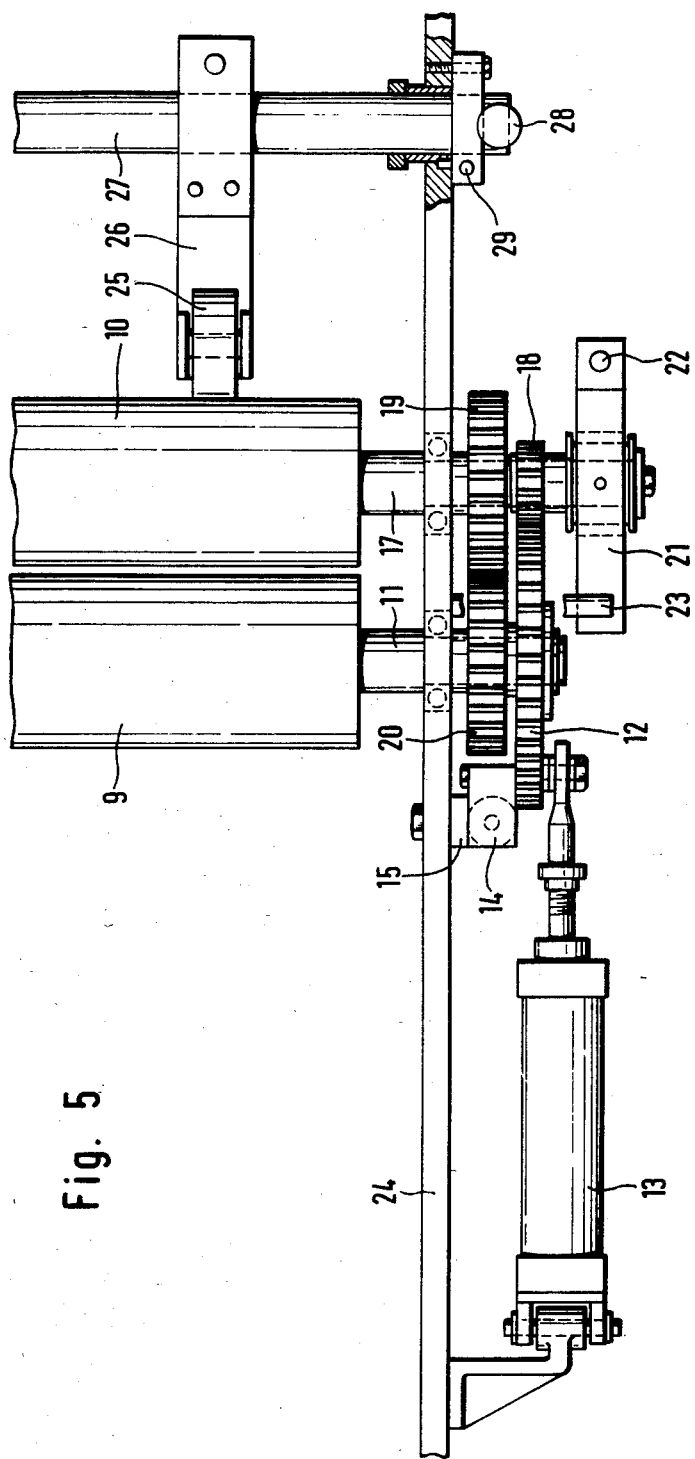
FIG. 5 is a plan view of the means for intermittently advancing the web.

For the purpose of cyclically feeding the web 7, a drive gear 12 to which the piston rod of a piston cylinder unit 13 is connected is freely rotatable on the roller shaft 11 (FIG. 5). This piston cylinder unit 13 is pneumatically actuated so that, whilst the piston rod is being projected, the drive gear 12 will turn counterclockwise until the cam 14 fixed to the drive gear 12 lies against the fixed abutment 15. This abutment 15 is adjustable to determine the angle of rotation, as is the abutment 16 which limits the movement of the drive gear 12 in the clockwise direction during retraction of the piston rod into the piston cylinder unit 13. The drive gear 12 is in mesh with an intermediate gear 18 placed on the shaft 17 of the roller 10, the intermediate gear 18 being provided with a free-wheeling device. The latter ensures that the intermediate gear 18 will turn only in the clockwise direction. Next to the intermediate gear 18 on the roller shaft there is a gear 19 engaging a gear 20 which is disposed on the roller shaft 10 and by way of which the roller 9 can be driven. The gears 19 and 20 are consequently fixed to the roller shafts 17 and 11. To prevent the rollers 9 and 10 from turning further when the cam 14 strikes the abutment, there is a friction brake 21 secured on the roller shaft 17, its friction being adjustable by a clamping screw 22. The friction brake 21 itself is fixed by way of a counterbearing 23 to the machine frame 24. To facilitate trouble-free feeding, a pressure roller 25 is mounted in an arm 26. This arm 26 is secured to a shaft 27 which can be turned by a handle 28 to enable the pressure of the pressure roller 25 to be adjusted relatively to the roller 10. After setting the pressure with the handle 28, the set screw 29 is tightened so that the pressure roller 25 will always lie against the roller 10 with the same force. Although in this example reference is made to only one pressure roller, there are in fact several pressure rollers juxtaposed on the shaft 27 for application to the roller 10 in unison by turning the shaft 27. The web portion 30 withdrawn by the feed rollers 9 and 10 is laterally held by the guide rods 31 and is freely suspended.

Figure 2:
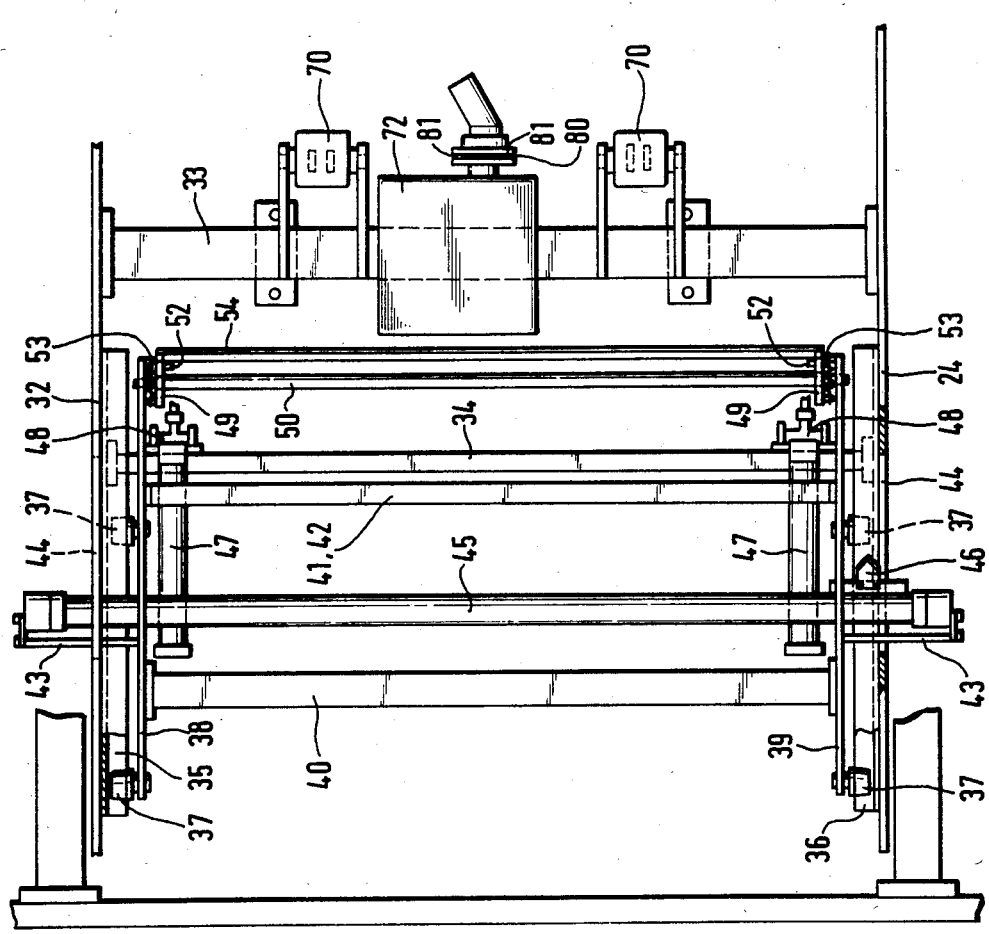
FIG. 2 is a plan view of the front portion of the FIG. 1 apparatus.

As will be evident from FIG. 2, the two machine frames 24 and 32 are rigidly interconnected by the cross-members 33 and 34. Guide rails 35 and 36 are connected to the insides of the machine frames 24 and 32. Rollers 37 fixed to side walls 38 and 39 run in these guide rails. The side walls 38 and 39 are in turn interconnected by sections 40, 41 and 42. The side walls 38 and 39 carry mountings 43 which project outwardly through cut-outs 44 provided in the machine frames 24 and 32. These mountings 43 carry a double-acting cylinder 45 which has no piston rod and comprises a longitudinal slot (not shown). A knife 46 projecting outwardly through this longitudinal slot is fixed to the piston (likewise not shown) of the cylinder 45.

Two further piston cylinder units have their cylinders pivoted by way of bearings 48 to the fixed cross-member 34. The piston rods of these piston-cylinder units 47 engage plates 49 connected to a shaft 50 which is rotatably mounted at the side walls 38 and 39. The pivotability of plates 49 is limited. For this purpose, the plates 49 have elongate holes 51 into which pins 52 project that are fixed to the side walls 38 and 39. In the position illustrated in FIG. 3, the piston rods of the piston cylinder units 47 have been slightly projected to such an extent that the springs 53 connected to the side walls 38 and 39 at one end and to the plates 49 at the other are so stressed that the base of the two elongate holes 51 lies against the pins 52. The sweeper bar 54 interconnecting the plates 49 has been lifted to a certain extent. The springs 53 are tension springs and so secured that they always tend to swing the plates 49 in the counter-clockwise direction. They are to ensure that the sweeper bar 54 can be raised even if the side walls 38 and 39 run more rapidly on the inclined guide rails 35 and 36 than the piston rod is for example projected from the piston cylinder unit 47. The springs are therefore merely a safety device.

Figure 3:
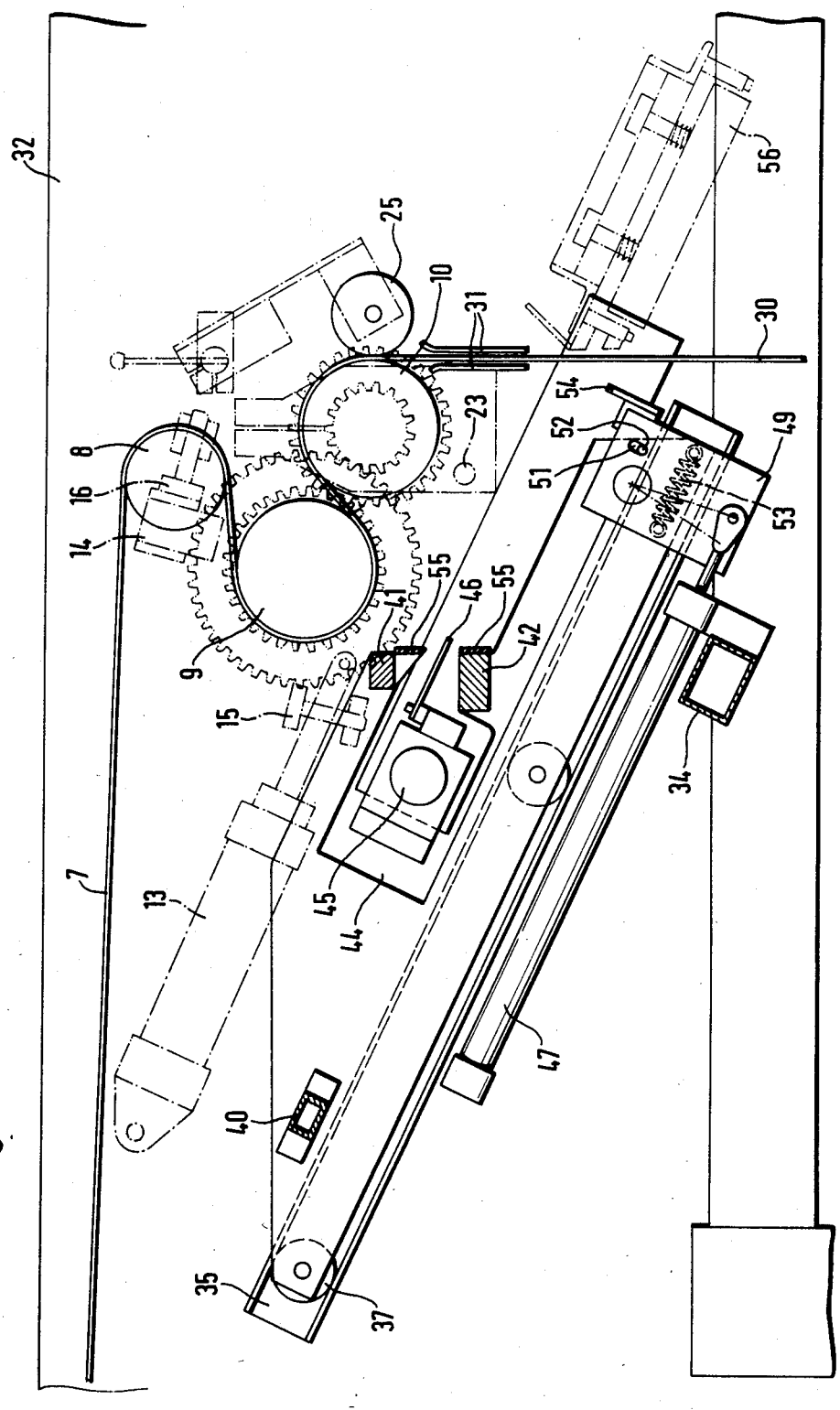
FIG. 3 is an enlarged side elevation of the FIG. 2 portion of the apparatus.

From FIG. 3, in which the front machine frame 24 is not illustrated, it will be seen that clamping bars 55 are connected to the sections 41 and 42. If, now, the piston rods of the piston cylinder units 47 are projected further, the web portion 30 is swept by the sweeper bar 54 under a suction box 56. As soon as the sweeper bar 54 has reached its projected limiting position, the clamping bars 55 will also abut counter-bars 57 (FIG. 4), and thereby clamp the web portion 30 tight. When this has happened, air is pressed into the cylinder 45, by which the piston (not shown) and hence the knife 46 connected thereto is moved from its FIG. 2 position to the opposite limiting position. The web portion 30 is thereby severed from the web and only held by the suction box 56. The piston cylinder units 47 are then actuated in the opposite direction so that the piston rods become retracted. This causes the plates 49 to swing clockwise until the pins 52 abut the upper end of the elongate holes 51. During further movement, the side walls 38 and 39 and the parts connected thereto are then returned to their original position shown in FIG. 3. For one thing, pivoting of the plates 49 serves to lift the sweeper bar 54 during projection of the piston cylinder units 47 and for this bar to sweep the web portion 30 under the suction box 56. For another, it serves to release the sweeper bar 54 from the suction box 56 and thus also from the web portion 30 during its return movement.

Bolts 58 are screwed to the suction box 56, every two bolts passing through apertures in a cross-bar 59 and the heads of the bolts 58 being pressed against the cross-bar 59 by compression springs 60. Altogether, two cross-bars 59 are provided. Both cross-bars interconnect two angle bars 61 and 62 which are somewhat longer than the web portion 30 is wide. Welding bars 63 are fixed to the two angle bars 61 and 62. Apart from the two cross-bars 59, the two angle bars 61 and 62 are interconnected by two further cross-bars 64 which are at a spacing from each other and offset from the cross-bars 59 in height as well as laterally. Hinged to each cross-bar 64 there is a compensating plate 65 held parallel to the cross-bars 64 by compression springs 66 of equal strength. Swing levers 67 fixed to the compensating plates 65 are pivoted at one end to the table frame 69 by bolts 68. Pivotal motion of the swing arms 67 occurs by way of two piston cylinder units 70. In the FIG. 4 position, the piston cylinder units 70 pull the cross-bars against abutments 71 fixed to the cross-member 33. In FIG. 2, suspension of the two piston cylinder units 70 is shown diagrammatically. The cross-member 33 also carries a suction fan 72 having a pipe nipple 73. This pipe nipple 73 has a securing flange 74 to which the cylinder 75 of a piston cylinder unit 76 is connected. The piston rod 77 of the piston cylinder unit 76 is connected to a locking slide 78 having an aperture 79. The locking slide 78 is guided in a slot defined by the securing flange 74, lateral spacer plates 81 and a cover plate 80. This plate 80 has two bores 82 and 83, the bore 82 corresponding to the passage of the pipe nipple 73 and the bore 83 corresponding to a bore 84 provided in the securing flange 74.

Figure 4:
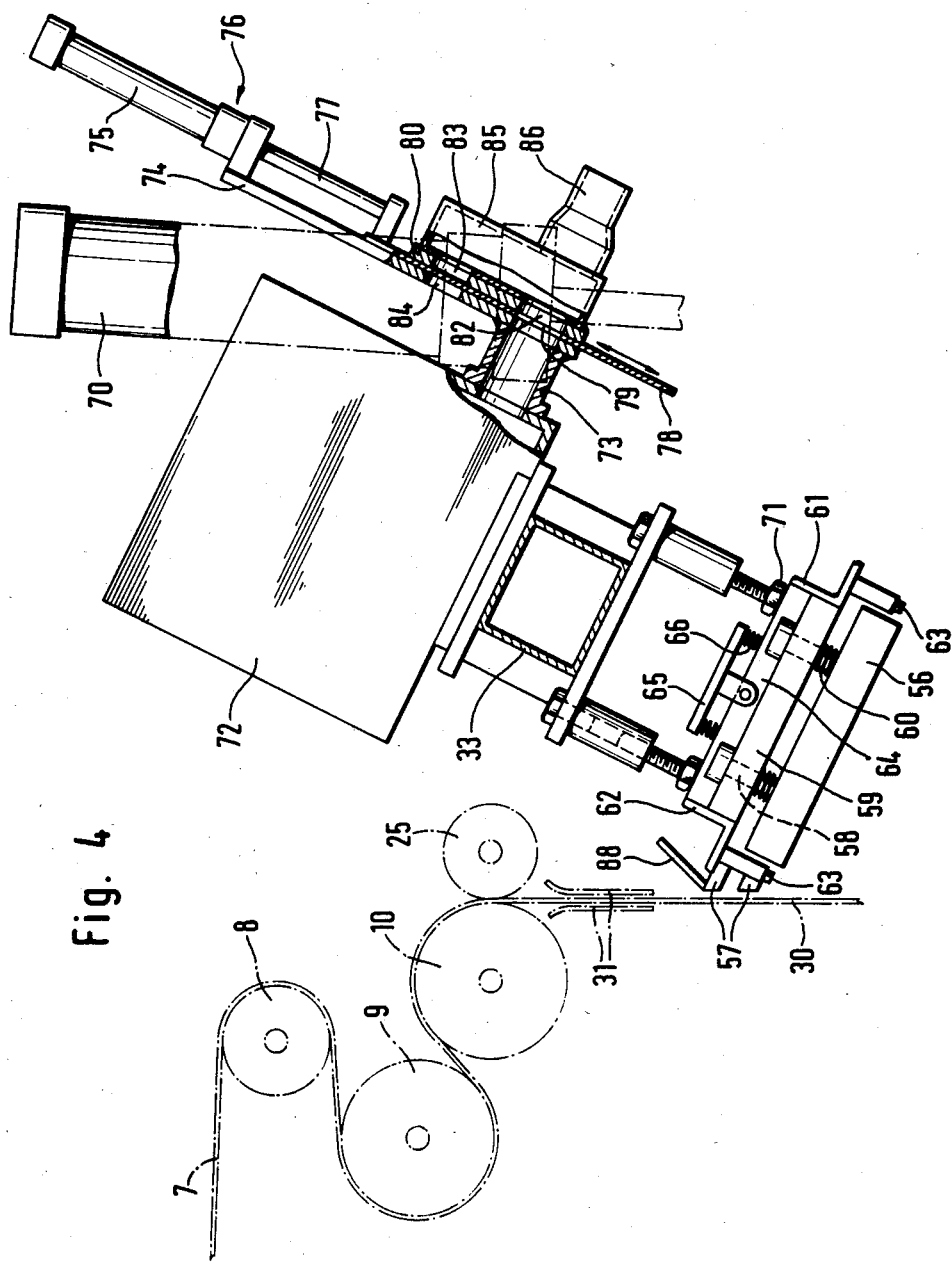
FIG. 4 is a side elevation of the carrier with associated parts.

In the slide position of FIG. 4, communication from the bore 83 to the bore 84 is closed and the passage from bore 82 to the pipe nipple 73 is open. The bores 82 and 83 open into a housing 85 having a connecting nipple 86. This connecting nipple 86 communicates with the suction box 56 through a hose (not shown). In the FIG. 4 position, therefore, there will be a vacuum in the suction box 56 so that the web section 30 is held by the suction box 56. From the full line position in FIG. 1, the suction box 56 is then swung downwardly by the piston cylinder units 70 and the swing arms 67 and it places the web section 30 as an internal lock onto the pre-opened base of a tube section which rests on the table 87 and has been omitted for the sake of simplicity. As soon as this has occurred, the piston cylinder unit 76 is actuated and the piston rod 77 is thereby retracted. During this movement, the locking slide 78 blocks the connection of bore 82 to the passage of the pipe nipple 73 and establishes communication between the bores 83 and 84 so that the suction in the box 56 can immediately start to decrease. This switching over of the locking slide 78 occurs during the time that the web portion 30 is being welded as an interior lock onto the pulled-open base of a sack. Thereafter, the suction box 56 is pivoted back to the full line position of FIGS. 1 and 4. To prevent a web portion that has in the meantime been advanced by the feed rollers 9 and 10 from colliding with the pivotable equipment, the upper backing bar 57 is connected to a flanged guide plate 88 which holds the freely suspended web portion 30 away from the pivotable equipment even if it were to be pressed towards same by, for example, a small air draught.

I claim:

1. Apparatus for applying to a flat workpiece a web section severed from a web withdrawn from a supply reel, preferably an inner lock or base cover sheet to a pulled-open base or one that is already closed, said apparatus comprising:

a machine frame;
cutter carriage means carried by said frame for reciprocating movement toward and away from a web for cutting the web to provide a web section, said carriage means having a cutter movable transversely relative to the web;
web feeding means carried by said frame for intermittently feeding the web to a position adjacent said carriage means with said web freely suspended from said web feeding means, said carriage means positioned on one side of the suspended web;

suction gripping means carried by said frame on the opposite side of the suspended web from the cutter carriage means, said suction gripping means including a suction surface in communication with a source of suction, said suction surface adapted to receive and support a portion of the web;

sweeper means supported on said carriage means for movement through a plane defined by a freely suspended portion of the web, said sweeper means movable against the suspended portion of the web for sweeping the suspended portion of the web against the suction surface and away from the plane defined by the freely suspended web; and pivoting means connected to said suction means for pivotally moving said suction surface through an acute angle from a first, web receiving position to a second, web depositing position to carry a cut web portion to the flat workpiece.

2. Apparatus according to claim 1, wherein the machine frame includes guide means and the carriage is movable in said guide means and parallel to the suction surface of the suction means when the suction surface is swung to its first, web receiving position.

3. Apparatus according to claim 1, wherein said suction means is provided on a side facing the freely suspended web section with clamping jaws having spaced parallel clamping faces disposed in a plane substantially parallel to the freely suspended web section, and said carriage means includes clamping surfaces cooperable with said clamping faces on said suction means for clamping an upstream portion of the web section after the freely suspended portion has been swept onto the suction means.

4. Apparatus according to claim 1, wherein the sweeper means is movable relative to the carriage means and can be raised relative to the carriage means and toward the web during advancement of the carriage means toward the web and lowered from the web during a return movement of the carriage means.

5. Apparatus according to claim 4, wherein advance and retraction of the carriage means relative to the suspended web is effected by a piston-cylinder means supported on said machine frame and hinged to a lever means which is carried by carriage means and pivotally mounted for limited pivotal movement relative to the carriage means, said sweeper means carried on said lever means.

6. Apparatus according to claim 5, wherein the lever means includes spring means connected to the carriage means at a spacing from the lever pivot on the carriage for urging the sweeper means to the raised position.

7. Apparatus according to claim 6, wherein the force of the spring means is less than the force applied on the carriage means by the piston-cylinder means for returning the carriage means in order to permit the sweeper means to be lowered from the web during return movement of the carriage means.

* * * * *